(12) United States Patent  
Kelly

(10) Patent No.: US 6,679,645 B2
(45) Date of Patent: Jan. 20, 2004

(54) FURNITURE SUPPORT SYSTEM

(75) Inventor: James H. Kelly, Pulaski, VA (US)

(73) Assignee: Pulaski Furniture, Pulaski, VA (US)

( * ) Notice: Subject to any disclaimer, the term of this patent is extended or adjusted under 35 U.S.C. 154(b) by 0 days.

(21) Appl. No.: 10/051,061

(22) Filed: Jan. 22, 2002

(65) Prior Publication Data

US 2003/0063950 A1 Apr. 3, 2003

Related U.S. Application Data

(60) Provisional application No. 60/326,445, filed on Oct. 3, 2001.

(51) Int. Cl.[7] ............................. B25G 3/00; F16B 9/00
(52) U.S. Cl. ................................... 403/264; 403/408.1
(58) Field of Search ........................... 403/230, 231, 403/264, 294, 408.1, 245, 292

(56) References Cited

U.S. PATENT DOCUMENTS 4,728,215 A * 3/1988 Martincic et al. ....... 403/245 X
4,783,189 A * 11/1988 Bugg ...................... 403/230 X
5,613,793 A * 3/1997 Dennis et al. ........... 403/230 X
6,120,207 A * 9/2000 Goto ...................... 403/230 X

* cited by examiner

Primary Examiner—John R. Cottingham
(74) Attorney, Agent, or Firm—McGuireWoods LLP

(57) ABSTRACT

A furniture support system generally includes a first frame member, a second frame member, at least one pin inserted into the first frame member, and at least one fastener inserted into the second frame member. The fastener is engageable with the pin via an eyelet in the pin so as to secure first and second frame members together at a substantially right angle. The pin is inserted into the first frame member through a bore, and the fastener is inserted into the second frame member through a channel. One end of the fastener is located within a recessed portion of the second frame member, while the other end is inserted into the first frame member through a cross-bore that intersects the bore at a substantially right angle. The eyelets on the pin are substantially aligned with the cross-bores such that the end of the fastener inserted into the first frame member can engage the eyelet. A perimeter of the recess is surrounded by a reinforcing ring, and a reinforcing plate is also provided. Corresponding dowel holes may be provided on the first and second frame members to facilitate proper alignment of the members prior to securing them together. The system is adaptable to multiple sizes or types of furniture.

19 Claims, 7 Drawing Sheets

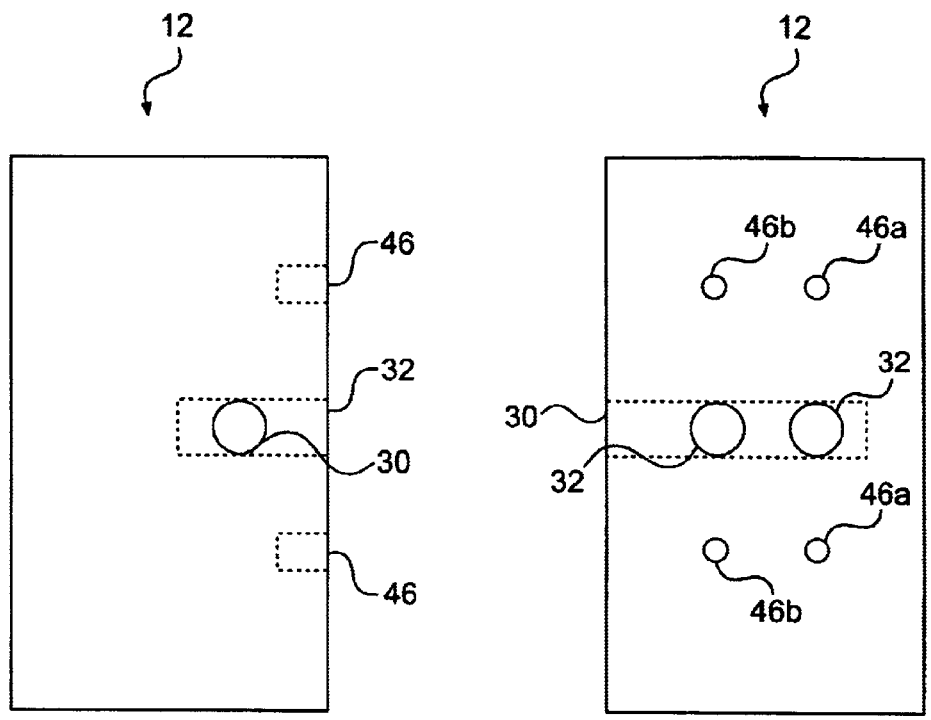
FIG. 2   FIG. 3
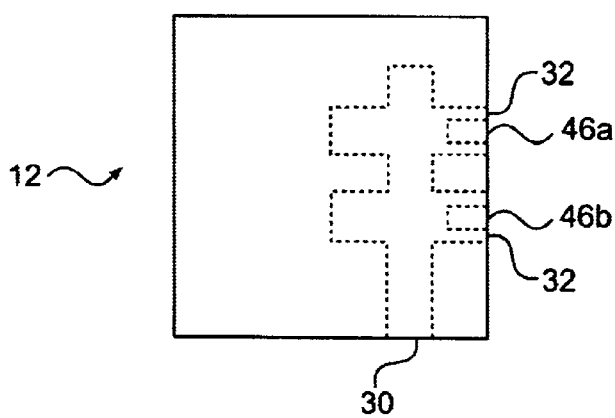
FIG. 4

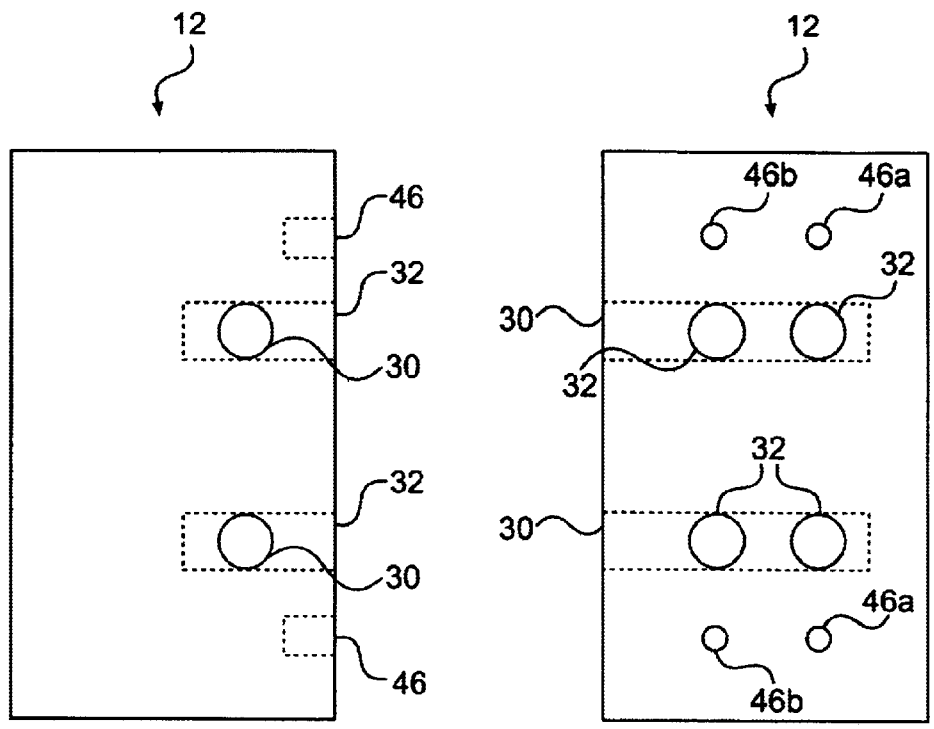
FIG. 11          FIG. 12
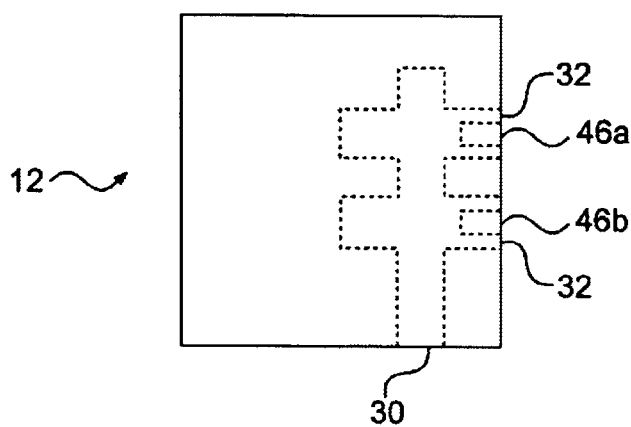
FIG. 13

FURNITURE SUPPORT SYSTEM

CROSS REFERENCE TO RELATED APPLICATIONS

This application claims priority under 35 U.S.C. §120 of U.S. Provisional Patent Application Ser. No. 60/326,445, filed Oct. 3, 2001, the content of which is hereby incorporated by reference.

DESCRIPTION BACKGROUND OF THE INVENTION

1. Field of the Invention

The present invention relates generally to a furniture unit, and more particularly to a support structure for a piece of furniture.

2. Background Description

In the furniture industry, it is necessary to provide a support structure for the piece of furniture being manufactured. For example, a chair includes a frame on which the seat and seatback are mounted, and a bed includes a frame on which the mattress and box spring are placed. A bed frame is typically made up of four posts, one located at each corner of the mattress, with the posts being connected by side rails. Cross members along the length of the bed are then used to span the gap between the side rails, and the mattress and box spring are placed on top of the cross members. A decorative headboard and footboard may also be provided for ornamental purposes. The headboard and footboard may be formed either separately from or integral with the bed frame itself. As another example, in some chairs, the leg members, which are analogous to bed posts, are connected by side members, which can be analogized to bed side rails. The seat is placed on top of the chair frame created by the leg and side members. When properly assembled, the joints between the members will be secure and neatly finished.

Over time and with use, however, the connection between the side members and the post members begins to loosen and otherwise degrade. Though still structurally sound and capable of supporting a load, the slack developing in the joints will cause the piece of furniture to wobble slightly, which may make the occupant physically uncomfortable. This movement may further cause an undesirable aesthetic effect on the furniture, as a piece of furniture with a small gap between its components is unattractive and unsightly by comparison to a well finished, newly assembled product. The movement may also cause the finish of the piece of furniture to become marred as various parts rub against one another. In addition, squeaking or creaking noises may be caused as the components move with respect to one another.

To avoid or remedy these problems, the owner must periodically inspect the joints on the piece of furniture and make adjustments as necessary. Where an appropriate adjustment is impossible, for example, where a screw has become stripped, the owner will be required to replace parts entirely. This becomes both time consuming and expensive. Additionally, a simple repair may even be impossible, as there may be no user-serviceable connection between the members. In most cases, with current industry standard hooks, no adjustments can be made by the consumer to alleviate movement in the bed. In these cases, the owner will be forced to purchase an entirely new piece of furniture or perform a difficult and lengthy reconstruction of the damaged piece.

SUMMARY OF THE INVENTION

It is an object of the present invention to provide a furniture support system that has improved durability and stability over existing furniture support systems.

It is another object of the present invention to provide a furniture support system that is simple to manufacture and assemble.

It is yet another object of the present invention to provide a furniture support system that will substantially eliminate slack in its joints over time.

Still another object of the present invention is to provide a single furniture support system adaptable to multiple different pieces of furniture.

To achieve these objects, there is provided a furniture support system generally including a first frame member, for example a bed post, a second frame member, for example a bed rail, at least one pin inserted into the first frame member, and at least one fastener inserted into the second frame member. The fastener is engageable with the pin via an eyelet in the pin so as to secure first and second frame members together at a substantially right angle.

The pin is inserted into the first frame member through a bore, and the fastener is inserted into the second frame member through a channel. One end of the fastener is located within a recessed portion of the second frame member, while the other end is inserted into the first frame member through a cross-bore that intersects the bore at a substantially right angle. The eyelets on the pin are substantially aligned with the cross-bores such that the end of the fastener inserted into the first frame member can engage the eyelet. A perimeter of the recess may be surrounded by a reinforcing ring having a hole substantially aligned with the channel, and a reinforcing plate having a hole generally corresponding to the recess may optionally be attached to the second frame member. Corresponding dowel holes may also be provided on the first and second frame members to facilitate proper alignment of the members prior to securing them together. Additionally, multiple bores, pins, cross-bores, dowel holes, recesses, and fasteners may be provided in order that the furniture support system may be used for different types of furniture (e.g., different sizes of mattress).

BRIEF DESCRIPTION OF THE DRAWINGS

FIG. 2 is a front view of one embodiment of the first frame member;

FIG. 3 is a side view of one embodiment of the first frame member;

FIG. 4 is a top view of one embodiment of the first frame member;

FIG. 11 is a front view of the first frame member illustrated in FIG. 10;

FIG. 12 is a side view of the first frame member illustrated in FIG. 10;

FIG. 13 is a top view of the first frame member illustrated in FIG. 10;

DETAILED DESCRIPTION OF THE PREFERRED EMBODIMENT OF THE INVENTION

Figure 9:
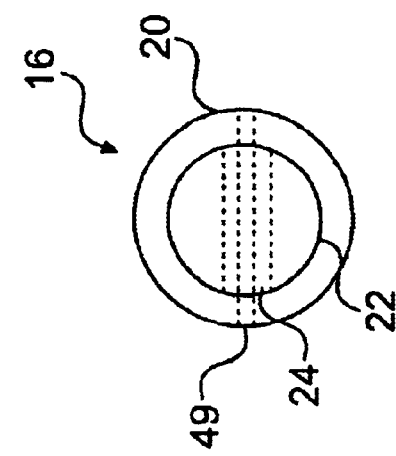
FIG. 9 is an end view of the pin.
Figure 8:
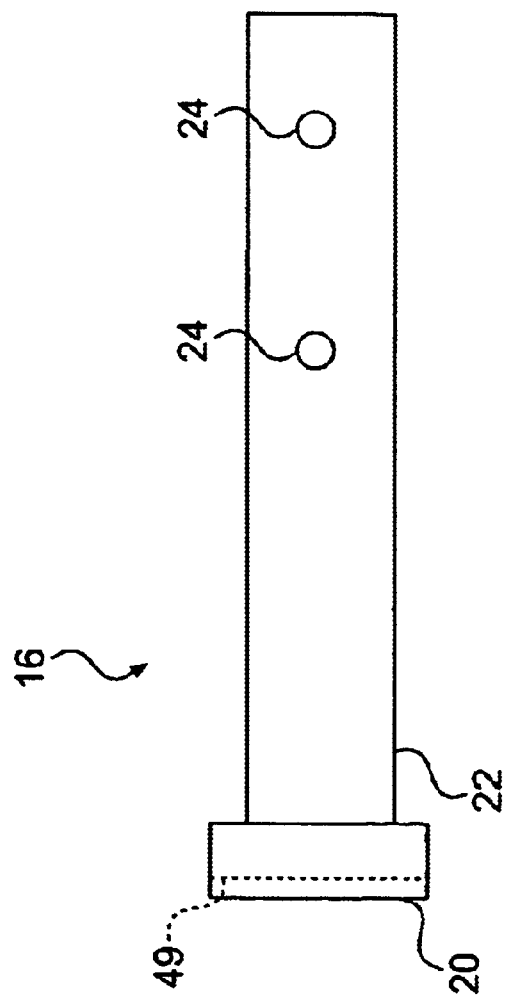
FIG. 8 is a side view of the pin.
Figure 10:
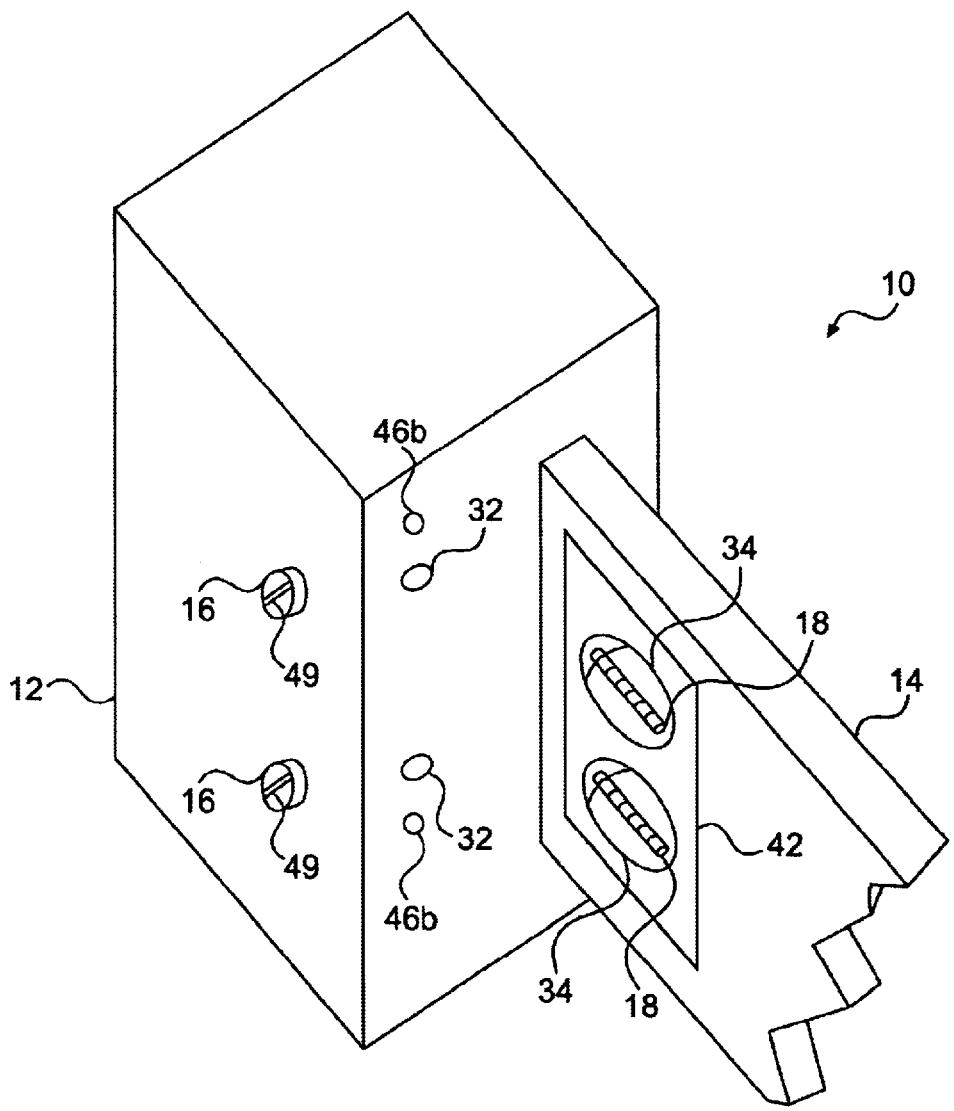
FIG. 10 is a perspective view of an assembled furniture support system according to one embodiment of the present invention.
Figure 15:
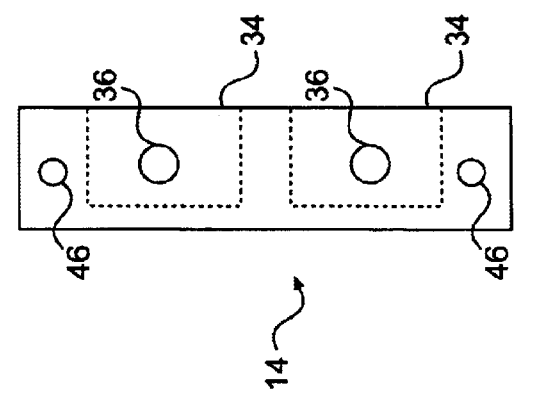
FIG. 15 is a side view of the second frame member illustrated in FIG. 10.
Figure 14:
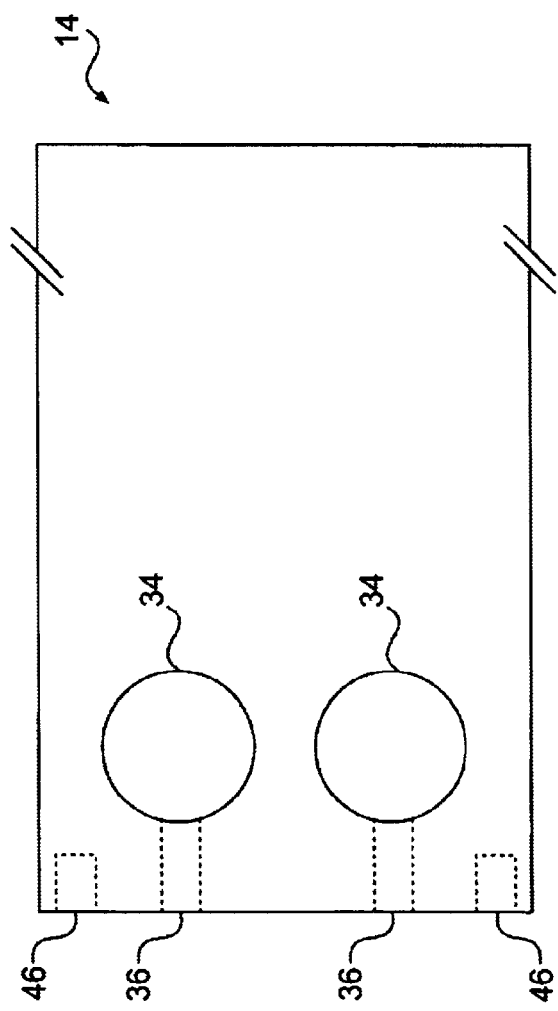
FIG. 14 is a front view of the second frame member illustrated in FIG. 10.
Figure 16:
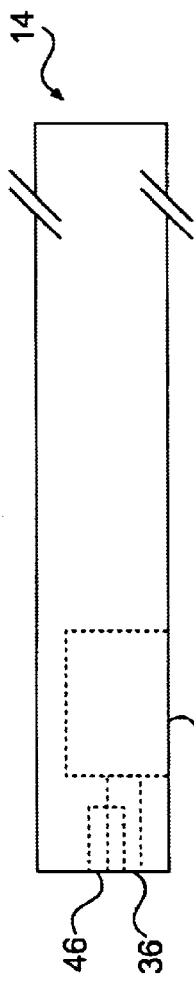
FIG. 16 is a top view of the second frame member illustrated in FIG. 10.

Referring now to FIGS. 1–16, a furniture support system 10 generally includes a first frame member 12, a second frame member 14, at least one pin 16 inserted into first frame member 12, and at least one fastener 18 inserted into second frame member 14. Pin 16 has a head portion 20 and a body portion 22, with body portion 22 including at least one eyelet 24. Preferably, the diameter of head portion 20 is greater than the diameter of body portion 22, as shown in FIGS. 8 and 9. (FIG. 8 further shows that body portion 22 includes two eyelets 24, while FIG. 9 further shows that eyelets 24 are substantially perpendicular to a longitudinal axis of pin 16.) Fastener 18 has a first end 26 and a second end 28, with second end 28 being engageable with eyelet 24 such that first and second frame members 12 and 14 can be secured to each other at a substantially right angle. Fastener 18 can be an externally threaded rod and a nut, with the external threads on the rod threadably engageable with internal threads on eyelet 24. It should be recognized by those of skill in the art that other types of fasteners (e.g., bolts) are also contemplated for use in the present invention.

In a preferred embodiment of the invention, first frame member 12 is a bed post and second frame member 14 is a bed rail. However, it will be apparent to one skilled in the art that the present invention is not limited to a bed assembly and can be adapted to the assembly of other pieces of furniture as well.

First frame member 12 includes at least one bore 30. Bore 30 has a diameter sized to accept insertion of body portion 22, but preferably not head portion 20, of pin 16. First frame member 12 also includes at least one cross-bore 32 with a diameter sized to accept insertion of second end 28 of fastener 18. Furthermore, eyelet 24 is positioned on body portion 22 such that, when pin 16 is inserted into bore 30 and appropriately rotated, eyelet 24 is substantially aligned with cross-bore 32. This allows second end 28 of fastener 18 to engage eyelet 24 when inserted into cross-bore 32. As best shown in FIGS. 2–4, cross-bore 32 intersects bore 30 at a substantially right angle.

Figure 1:
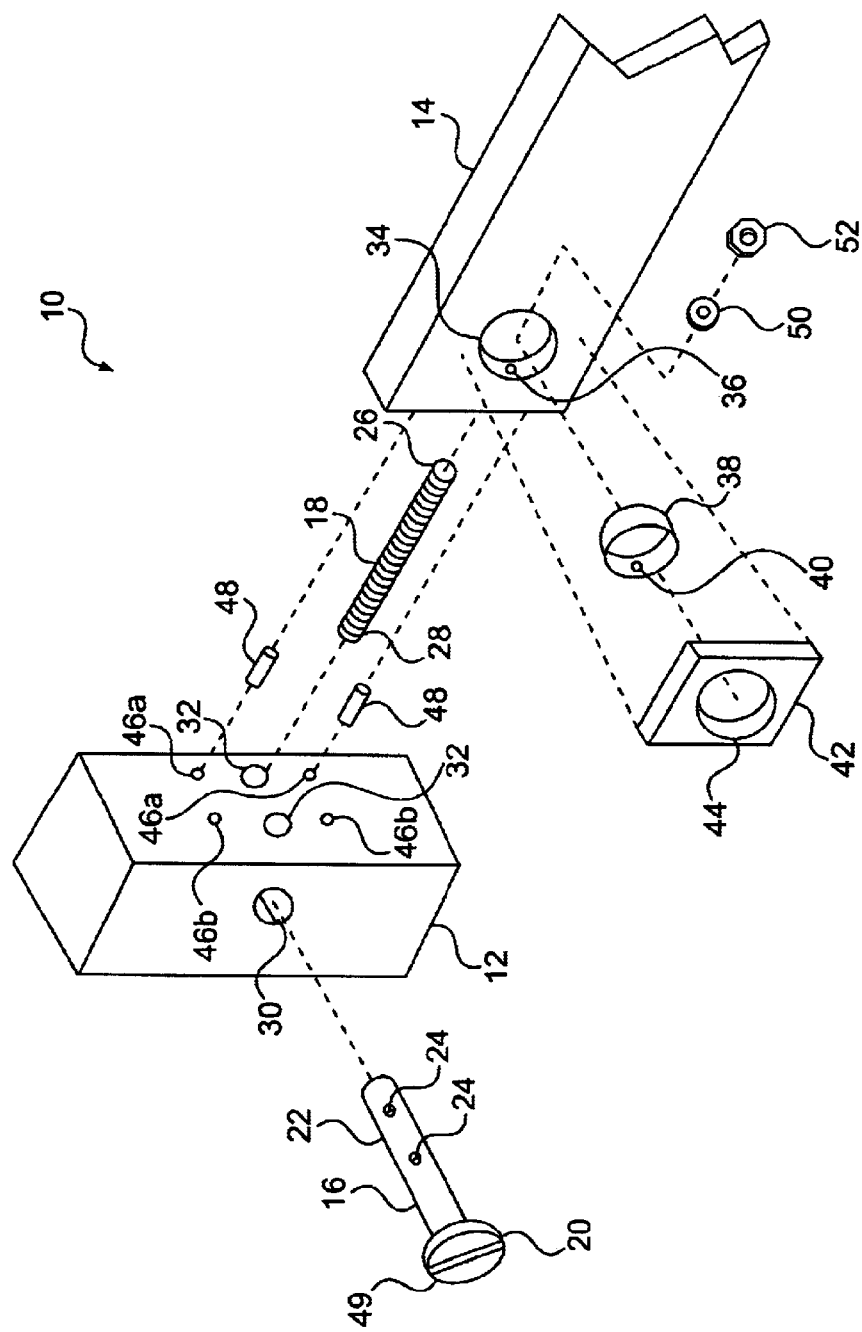
FIG. 1 is an exploded perspective view of one embodiment of the furniture support system according to the present invention.
Figure 6:
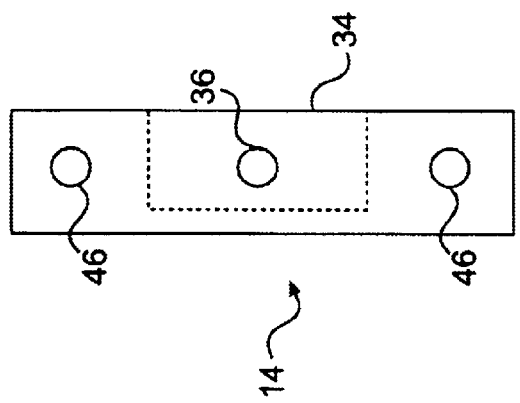
FIG. 6 is a side view of one embodiment of the second frame member.
Figure 5:
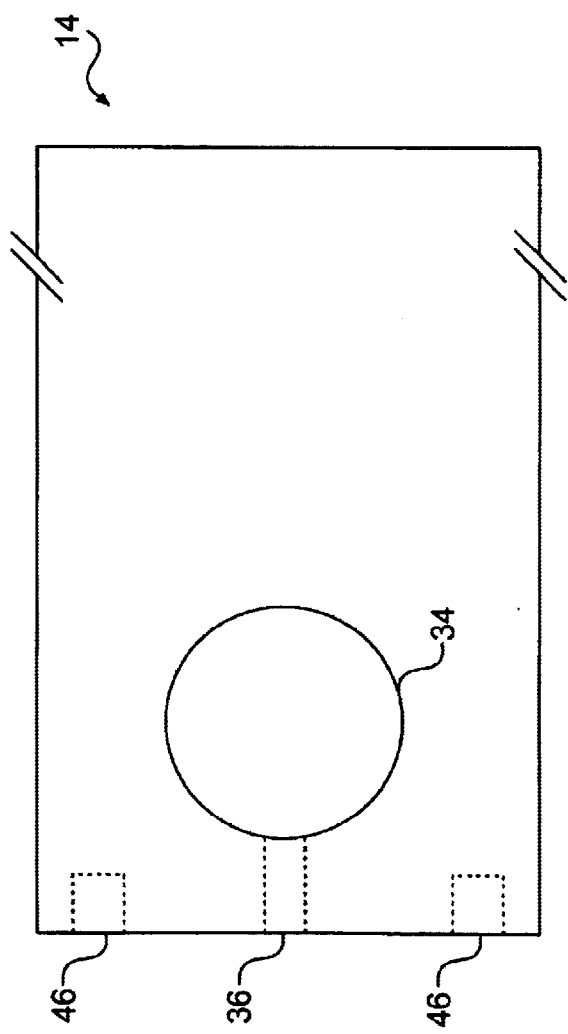
FIG. 5 is a front view of one embodiment of the second frame member.
Figure 7:
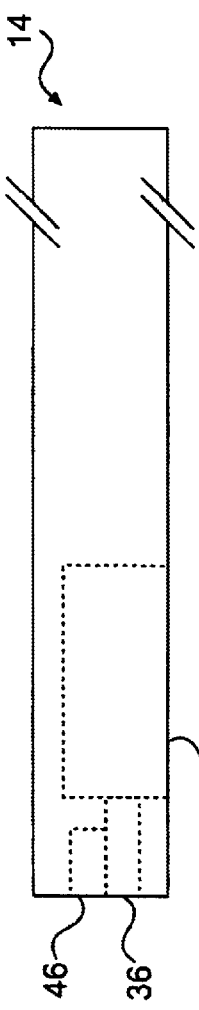
FIG. 7 is a top view of one embodiment of the second frame member.

Referring still to FIG. 1, second frame member 14 includes at least one recess 34, with first end 26 of fastener 18 extending through fastener channel 36 into recess 34. Recess 34 is preferably substantially round and adapted to receive a tool for tightening first end 26 of fastener 18 (e.g., a wrench for tightening a nut onto a threaded rod). A perimeter of recess 34 is surrounded by a reinforcing collar 38, which has a hole 40 aligned to allow fastener 18 to pass through collar 38 and channel 36 and into first frame member 12 via cross-bore 32. In addition, a reinforcing plate 42 having a hole 44 substantially aligned with recess 34 is provided on second frame member 14, for example by attaching plate 42 to second frame member 14 with screws or other fasteners. Preferably, collar 38 and plate 42 are metallic and serve to improve the durability and stability of furniture support system 10. Collar 38 and plate 42 may be separate or integrally formed with each other and/or with second frame member 14. For example, collar 38 may be welded to plate 42 to distribute the forces applied to second frame member 14.

First frame member 12 may optionally include at least one dowel hole 46, with second frame member 14 then including at least one corresponding dowel hole 46. Dowel holes 46 have diameters sized to accept insertion of one or more dowels 48, which can serve to correctly align second frame member 14 before securing it to first frame member 12. FIGS. 2–7 best illustrate the alignment of dowel holes 46.

From the foregoing description, it should be obvious to one skilled in the art that the number of pins 16, fasteners 18, bores 30, cross-bores 32, recesses 34, dowel holes 46, and dowels 48 is dependent upon the type of furniture for which furniture support system 10 is intended. For example, FIGS. 1–7 illustrate an embodiment of the invention that can be used to assemble either a king-sized bed or a California king-sized bed by providing two sets of dowel holes 46a and 46b and two cross-bores 32. By assembling the furniture support system 10 along the dashed lines of FIG. 1 (that is, into dowel holes 46a and cross-bore 32 to the right in FIGS. 1 and 3), one would build a king-sized bed. Utilizing the other set of dowel holes 46b and cross-bore 32 (that is, dowel holes 46b and cross-bore 32 to the left in the FIGS. 1 and 3) would yield a California king-sized bed.

It should also be noted that two pins 16 with corresponding bores 30, fasteners 18 with corresponding recesses 34 and cross-bores 32, and dowel holes 46 with corresponding dowels 48 can be used, as shown in FIGS. 10–16, if so desired. The second embodiment illustrated in FIGS. 10–16 is substantially similar to the first embodiment illustrated in FIGS. 1–7 and described above, and like reference numerals have been used to designate like elements. It will further be apparent to one skilled in the art that the same teachings can be extended to incorporate more than two pins 16, bores 30, fasteners 18, recesses 34, and cross-bores 32 into furniture support system 10, depending on such variables as weight, size, and desired durability.

By providing multiple sets of dowel holes 46, bores 30, and cross-bores 32, the manufacture of furniture support system 10 is greatly simplified, as only a single set of plans will be necessary to cover all desired pieces of furniture. For example, a single decorative headboard or footboard having standard widths can be used with the illustrated embodiments of furniture support system 10 regardless of whether the bed is to be king-sized or California king-sized, as the differing dimensions are accounted for in first frame member 12 rather than the headboard or footboard.

Assembly of the Furniture Support System

One method of assembling a furniture support system 10 will now be described with reference to the embodiment illustrated in FIG. 1. One skilled in the art will recognize, however, that the steps described below can largely be performed in any order; those steps where a particular order is required will be readily apparent. Furthermore, it will be clear that the description applies to only one embodiment of the present invention, and that additional, but similar, steps will be necessary for different embodiments of furniture support system 10. For example, the embodiment of furniture support system 10 illustrated in FIG. 10 will require insertion of two pins 16 and tightening of two fasteners 18 rather than one as described below.

Pin 16 is inserted into first frame member 12 through bore 30. Head portion 20 has a diameter larger than body portion 22, and therefore will remain outside of bore 30. Thus, head portion 20 can be used to rotate pin 16 in bore 30 such that eyelets 24 are substantially aligned with cross-bores 32, for example by inserting a straight blade screwdriver into a milled slot 49 in head portion 20.

Collar 38 is placed into recess 34 such that hole 40 is aligned with channel 36. Reinforcing plate 42 is also attached to second frame member 14 such that hole 44 is substantially aligned with recess 34. It should be apparent to one skilled in the art that this step will not be necessary if collar 38 and plate 42 are integrally formed with each other and with second frame member 14. Furthermore, though collar 38 must necessarily be inserted prior to the insertion of fastener 18, one skilled in the art will recognize that plate 42 could be attached at a subsequent stage in the assembly if it is not integrally formed with second frame member 14 or collar 38.

Fastener 18 is inserted into second frame member 14 through channel 36 and hole 40 in collar 38 such that first end 26 of fastener 18 is within recess 34. Second end 28 of fastener 18 is then inserted into cross-bore 32 and engaged with eyelet 24. As described above, fastener 18 is preferably an externally threaded rod threadably engageable with internal threads within eyelet 24. One skilled in the art will realize, however, that other ways of accomplishing the axial alignment of cross-bore 32, fastener 18, and channel 36 are possible. For example, fastener 18 may be first inserted into cross-bore 32, then inserted through channel 36, and then engaged with eyelet 24.

Dowels 48 can then be inserted into dowel holes 46 in either first frame member 12 or second frame member 14. First and second frame members 12 and 14 can be properly aligned by aligning dowels 48 with corresponding remaining (that is, as yet unused) ones of dowel holes 46.

Finally, first frame member 12 is secured to second frame member 14 such that first and second frame members 12 and 14 are substantially orthogonal to each other. In the preferred embodiment, this is accomplished by threading second end 28 of fastener 18 partially into eyelet 24, optionally placing a washer 50 over first end 26 of fastener 18 abutting collar 38, placing a nut 52 onto first end 26 of fastener 18, and tightening nut 52 onto fastener 18 using an appropriate tool (e.g., a wrench sized to fit within recess 34 and turn nut 52 on fastener 18). However, other methods of engaging fastener 18 to pin 16, and thereby attaching first frame member 12 to second frame member 14, are contemplated.

Since first frame member 12 is attached to second frame member 14 with a positive, metal-to-metal connection (e.g., a threaded attachment between fastener 18 and eyelet 24), the development of slack in the joint between first and second frame members 12 and 14 is greatly reduced. Consequently, the piece of furniture so assembled will be more stable and longer lasting than existing systems. That is, over time, the connection between first and second frame members 12 and 14 is much less subject to the degradation that results in the need to retighten or reinforce the connection. This durability is further enhanced by collar 38 and plate 42, which prevent excessive wear, tear, and marring on second frame member 14. Aesthetically, recess 34 provides a countersink for fastener 18, making it possible to mount first and second frame members 12 and 14 to each other without utilizing a separate bracket.

While the invention has been described in terms of its preferred embodiments, those skilled in the art will recognize that the invention can be practiced with modification within the spirit and scope of the appended claims. For example, it should be obvious to one skilled in the art that the above describes the connections in only one portion of a complete furniture support system (e.g., only one bed post of four).

What is claimed is:

1. A furniture support system, comprising:
   a first frame member;
   a second frame member;
   at least one pin inserted into said first frame member, said at least one pin having a head portion and than a body portion, said body portion including at least one hole; and
   at least one fastener inserted into said second frame member and having a first end and a second end, said second end being engageable with said at least one hole of said at least one pin while said at least one pin remains fixed in relation to said at least one fastener such that said first frame member is secured to said second frame member and said first and second frame members are substantially orthogonal to each other.

2. The furniture support system according to claim 1, wherein said first frame member is a bed post and said second frame member is a bed rail.

3. The furniture support system according to claim 1, wherein said at least one pin is two pins and said at least one faster is two fasteners.

4. The furniture support system according to claim 1, wherein said second frame member further comprises at least one recess and wherein said first end of said at least one fastener extends into said at least one recess.

5. The furniture support system according to claim 4, wherein said at least one recess is substantially circular.

6. The furniture support system according to claim 4, further comprising a reinforcing collar surrounding a perimeter of said at least one recess, said reinforcing collar having a hole aligned such that said at least one fastener can pass through said reinforcing collar and a fastener channel and into said first frame member.

7. The furniture support system according to claim 4, further comprising a reinforcing plate attached to said second frame member, said reinforcing plate having a hole substantially aligned with said at least one recess.

8. The furniture support system according to claim 4, wherein said at least one recess is two recesses.

9. The furniture support system according to claim 4, wherein said at least one recess is adapted to receive a tool for tightening said first end of said at least one fastener.

10. The furniture support system according to claim 1, wherein said first frame member further comprises at least one bore for accepting insertion of said body portion of said at least one pin.

11. The furniture support system according to claim 10, wherein said at least one bore is two bores.

12. The furniture support system according to claim 10, wherein said first frame member further comprises at least one cross-bore for accepting insertion of said second end of said at least one fastener, said at least one cross-bore intersecting said at least one bore at a substantially right angle.

13. The furniture support system according to claim 12, wherein said at least one hole is substantially aligned with said at least one cross-bore.

14. The furniture support system according to claim 1, wherein said first frame member further comprises at least one dowel hole and said second frame member further comprises at least one corresponding dowel hole, said at least one dowel hole and said at least one corresponding dowel hole adapted to accept insertion of at least one dowel.

15. The furniture support system according to claim 1, wherein said at least one fastener comprises at least one externally threaded rod and at least one nut.

16. The furniture support system according to claim 15, wherein said at least one hole is internally threaded and said second end of said at least one rod is threadably engageable with said at least one hole.

17. The furniture support system according to claim 1, wherein:
- said first frame member further comprises:
  - at least one bore;
  - at least one cross-bore intersecting said at least one bore at a substantially right angle; and
  - at least two dowel holes;
- said second frame member further comprises:
  - at least one recess;
  - a reinforcing collar surrounding a perimeter of said at least one recess and having a hole aligned such that said at least one fastener can pass through said reinforcing collar and into said first frame member;
  - a reinforcing plate having a hole substantially aligned with said at least one recess; and
  - at least two corresponding dowel holes;
- said at least one fastener comprises at least one externally threaded rod and at least one nut, said first end of said at least one fastener extending into said at least one recess and said second end of said fastener threadably engaged with said at least one hole; and
- at least two dowels inserted into said at least two dowel holes in said first frame member and said at least two corresponding dowel holes in said second frame member.

18. The furniture support system according to claim 17, wherein: said at least one bore is two bores; said at least one cross-bore is two cross-bores; said at least one recess is two recesses; said at least one fastener is two fasteners; and said at least one pin is two pin.

19. A furniture support system, comprising:
- a first frame member;
- a second frame member;
- at least one pin inserted into said first frame member, said at least one pin having a head portion and than a body portion, said body portion including at least one internally threaded hole;
- at least one threaded rod inserted into said second frame member and having a first end and a second end, said second end being threadably engageable with said at least one internally threaded hole of said at least one pin to secure said first frame member to said second frame member such that said first and second frame members are substantially orthogonal to each other, said at least one pin being fixed in relation to said at least one threaded rod when said at least one threaded rod is engaging with said at least one internally threaded hole;
- at least one nut located on said first end of said threaded rod;
- at least one bore in said first frame member; and
- at least one cross-bore in said first frame member, said at least one cross-bore intersecting said at least one bore at a substantially right angle.

* * * * *